Patented July 18, 1939

2,166,604

UNITED STATES PATENT OFFICE 2,166,604

STABLE COMPOSITIONS COMPRISING CHLORINATED SUBSTANCES

Georg Meyer, Cologne-Mulheim, Germany, assignor to I. G. Farbenindustrie Aktiengesellschaft, Frankfort-on-the-Main, Germany No Drawing. Application April 17, 1933, Serial No. 666,628. In Germany April 22, 1932

10 Claims. (Cl. 260—735)

The present invention relates to new compositions of matter comprising chlorinated organic substances of high molecular weight and ethyleneoxide derivatives.

It is known that many higher molecular chlorinated organic substances tend to slowly split off hydrochloric acid at normal or somewhat elevated temperature. Obviously, this instability of the substances in question impairs their applicability for technical purposes to a substantial degree.

According to the present invention, this difficulty will be overcome by adding an ethyleneoxide derivative, that is a compound containing an ethyleneoxide grouping, to the chlorinated substances.

As higher molecular chlorinated organic substances may particularly be mentioned: chlorinated aliphatic or cycloaliphatic compounds containing more than 8 carbon atoms, such as rubber, paraffin hydrocarbons, waxes, train oils, fats, oils, colophony, higher fatty acids, resinic acids, naphthenic acids, etc.

Suitable ethyleneoxide derivatives, are, for example, ethyleneoxide, 1-methyl-, -ethyl-, -phenyl-, -benzyl-ethyleneoxide, 1.1'-. or 1.2-dimethyl-, -diethyl-, -methyl-ethyl-, -methylphenyl-, -diphenyl-ethyleneoxides, derivatives of ethyleneoxides being substituted by three or more alkyl or aryl groups, epichlorhydrin, epiodhydrin, epibromhydrin, glycide

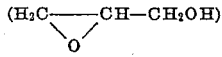

or its ethers (methyl-, ethyl-, propyl, dodecyl-, phenyl-, tolyl-, chloro- or bromophenyl-, xylyl-, alpha- or beta- naphthyl-ethers, for example), oxyacrylic acid

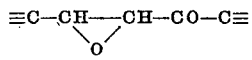

or its esters, or alkyl or aryl substitution products of these substances, ketones containing the grouping

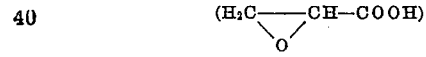

furthermore, cyclohexeneoxide, cyclopenteneoxide, tetrahydronaphthyleneoxide, butadieneoxide, diallyldioxide, diglycide ethers, etc.

Preferably, ethyleneoxide derivatives are applied having a boiling point above about 30° C. Ethyleneoxide derivatives of substantially higher boiling points, say between about 150–350° C. or even more are of advantage in all those cases, in which the compositions of matter are intended to be stable for a very prolonged time, or in cases in which they are exposed to elevated temperatures.

The manufacture of my new compositions of matter may, for example, be as follows:

The chlorinated higher molecular compounds if necessary after being ground, are mixed with the ethyleneoxide derivative, if desired, dissolved in a suitable inert solvent (alcohol, acetone, for example) by milling or grinding or by any other desired mechanical means. Furthermore, the ethyleneoxide derivative may be added to solutions of the chlorinated compounds. In this manner there can be produced, for example, in the case of chlorinated rubber, lacquers or varnishes not becoming acid even after a very prolonged time or at elevated temperatures. In case high boiling ethyleneoxide derivatives have been added, lacquers and coatings can be obtained, which are prevented from becoming acid for any desired length of time.

In many cases it may be of advantage to prepare my new compositions of matter as described above while heating.

The ethyleneoxide derivatives probably act to combine with the hydrochloric acid being slowly split off from the chlorinated substances.

From the fact that the action of the ethyleneoxide derivatives is to bind hydrochloric acid (probably by the addition of the same to the ethyleneoxide grouping) it results that the amount of the ethyleneoxide derivatives to be used is dependent on the stability of the chlorinated compounds per se as well as on the time, for which an acid reaction of the chlorinated compounds or of their solutions is to be prevented. Likewise, the type of the ethyleneoxide derivatives used is of some importance for the amount to be applied in order to obtain the best results. Generally, at least about 1–2% by weight of the ethyleneoxide derivatives (calculated on the amount of the chlorinated compound) should be applied. In case higher molecular ethyleneoxide derivatives, say, with a boiling point above about 100° C., are used, somewhat larger amounts of the same, for example, 3.5 or 5% by weight (calculated on the chlorinated compound) are desirable. Larger amounts of the ethyleneoxide derivatives are operable in all cases but are generally unnecessary.

Obviously, the ethyleneoxide derivatives may also be added to the chlorinated substances without isolating the same, for example, by chlorinating the higher molecular substances in question while being dissolved in a suitable solvent, removing the excess of the chlorine and of the hydrochloric acid being present after the chlorination process as far as possible and then adding the ethyleneoxide derivative, if desired, while heating. In case of chlorinated rubbers lacquers not becoming acid for any desired time can thus directly be obtained without isolating the chlorinated rubber. In some cases it will be of advantage to first stabilize the chlorinated compounds per se to a substantial degree, for example, by a treatment with alkali metal hydroxides at any desired temperature or with other weaker alkaline reacting agents, such as alkali metal carbonates or -bi-carbonates at elevated temperature, and then to add the ethyleneoxide derivative.

The following examples illustrate the invention, without, however, restricting it thereto.

*Example 1*

An about 30% by weight solution of a chlorinated rubber of an insufficient stability in xylene is mixed by stirring with 2% by weight of epichlor hydrine (calculated on the solid chlorinated rubber). This solution does not turn acid even after prolonged heating to 100° C. or after exposing to light.

*Example 2*

An about 30% by weight solution of the same chlorinated rubber as applied in Example 1 in a mixture of toluene and xylene is mixed by stirring at a temperature of 50° C. with 5% by weight of phenoxypropene-oxide (calculated on the solid chlorinated rubber).

Films or coatings obtained from this solution have a good stability even on heating or exposing to light. Instead of the phenoxypropeneoxide used in this example, its derivatives may be applied with a similar result, for example, ortho- or para-methyl-phenoxypropeneoxide, dimethyl-phenoxypropeneoxide, ortho- or para-chlorophenoxypropeneoxide, 2.4.6 - trichlorophenoxypropeneoxide etc., likewise the alpha- or beta-napthoxypropeneoxides.

*Example 3*

A solution of chlorinated rubber in carbon tetrachloride is freed to a far reaching extent from the superfluous chlorine and hydrochloric acid by distilling off part of the solvent. Thereupon the solution is emulsified by means of a dilute aqueous sodium carbonate solution, while stirring and heated to a temperature of about 60–65° C. for some hours under continuous stirring.

The emulsion is then precipitated by pouring or spraying the same into hot water in a suitable device, for example, a stirring apparatus, while distilling off the carbon tetrachloride. As soon as the precipitation is finished, 4% of phenoxypropeneoxide (calculated on the amount of the solid chlorinated rubber applied) are dropped in, which are wholly absorbed by the precipitated compound after several hours of stirring.

The product is then sucked off, washed and dried according to one of the usual methods. The chlorinated rubber thus obtained is of a very good stability.

*Example 4*

Chlorinated train oil is mixed by stirring with 4.2% by weight of dimethylglycide at a temperature of about 60–70° C. The product thus treated is of sufficient stability. For example, in a 30% solution of this train oil in xylene no hydrochloric acid can be traced even on heating the solution for some days to a temperature of 100° C.

*Example 5*

A chlorinated montan wax is mixed by stirring with 5% by weight of epichlorhydrin at a temperature of 70° C., or the same product is mixed with 3% by weight of glycide at the same temperature. Both the products thus treated are of a good stability.

*Example 6*

A chlorinated montan wax as described in Example 5 is mixed with 5% by weight of phenylmethylglycide acid ethyl-ester at a temperature of 70° C. The product thus obtained is of good stability.

I claim:

1. Composition of matter comprising a chlorinated rubber and an ethyleneoxide derivative selected from the group consisting of phenoxypropeneoxide and its homologues and halogen substitution products, the ethyleneoxide derivative being present in an amount between about 1 and about 5% by weight, calculated on the amount of the chlorinated rubber.

2. Composition of matter comprising a chlorinated rubber and an ethyleneoxide derivative of the probable formula:—

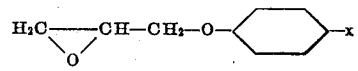

wherein $x$ means hydrogen or chlorine, the ethyleneoxide derivative being present in the composition in an amount between about 1 and about 5% by weight, calculated on the amount of the chlorinated rubber.

3. Composition of matter comprising a chlorinated rubber and phenoxypropeneoxide in an amount of about 4% by weight of the chlorinated rubber.

4. Composition of matter comprising a chlorinated rubber lacquer and an ethyleneoxide derivative selected from the group consisting of phenoxypropeneoxide and its homologues and halogen substitution products, the ethyleneoxide derivative being present in the composition in an amount between about 1 and about 5% by weight, calculated on the amount of the chlorinated rubber.

5. Composition of matter comprising a chlorinated rubber lacquer and an ethyleneoxide derivative of the probable formula:

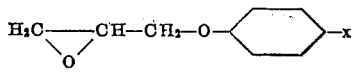

wherein $x$ means hydrogen or chlorine, the ethyleneoxide derivative being present in the composition in an amount between about 1 and about 5% by weight, calculated on the amount of the chlorinated rubber.

6. Composition of matter comprising a chlorinated rubber and phenoxypropeneoxide in an amount of about 4% by weight of the chlorinated rubber.

7. The composition of matter comprising a chlorinated rubber and an ethylene oxide derivative of a boiling point of above about 30° C. in an amount sufficient to neutralize any hydrogen chloride split off from the chlorinated rubber.

8. The composition of matter as claimed in claim 7, in which the ethylene oxide derivative has a boiling point between about 150 and about 350° C.

9. The composition of matter as claimed in claim 7, in which the ethylene oxide derivative is present in an amount between about 1.5 and about 5.0 per cent. by weight calculated upon the chlorinated rubber.

10. The composition of matter comprising a chlorinated rubber lacquer and an ethylene oxide derivative of a boiling point of above about 30° C. in an amount sufficient to neutralize any hydrogen chloride split off from the chlorinated rubber.

GEORG MEYER.